United States Patent
Combs et al.

(10) Patent No.: US 12,469,187 B1
(45) Date of Patent: Nov. 11, 2025

(54) METHOD AND SYSTEM FOR ASSOCIATING AND AUTHENTICATING AUGMENTED REALITY CONTENT WITH A PHYSICAL OBJECT

(71) Applicant: Eventshop, Inc., Brentwood, TN (US)

(72) Inventors: Spencer Combs, Brentwood, TN (US); Jeb Holmes, Nashville, TN (US); Connor T Dwyer, Nashville, TN (US); Robert W Nunn, Jr., West Hills, CA (US); Craig E Casey, Minneapolis, MN (US)

(73) Assignee: EVENTSHOP, INC., Brentwood, TN (US)

( * ) Notice: Subject to any disclaimer, the term of this patent is extended or adjusted under 35 U.S.C. 154(b) by 0 days.

(21) Appl. No.: 19/294,844

(22) Filed: Aug. 8, 2025

(51) Int. Cl.
*G06T 11/00* (2006.01)
*G06F 21/34* (2013.01)
(Continued)

(52) U.S. Cl.
CPC .............. *G06T 11/00* (2013.01); *G06F 21/34* (2013.01); *G06K 7/10366* (2013.01);
(Continued)

(58) Field of Classification Search
CPC ... G06T 11/00; G06T 7/70; G06T 7/75; G06T 7/50; G06T 13/20; G06T 19/003; G06T 19/006; G06T 15/20; G06T 2207/10028; G06T 7/12; G06T 7/40; G06T 15/10; G06T 2210/61; G06K 7/1413; G06K 7/1417; G06K 7/10366; G09G 2340/12; H04W 4/023–029; H04W 12/02; H04W 12/06; H04W 12/00522; G02B 2027/0138; G02B 2027/0187; G02B 2027/014; G02B 27/017; G02B 27/0101; G01C 21/3632; G01C 21/3647; G01C 21/206; G06F 21/34; G06F 21/36; G06F 21/606; G06F 3/0346; G06F 3/011; G06F 16/58; G06F 3/048;
(Continued)

(56) References Cited

U.S. PATENT DOCUMENTS 7,967,211 B2   6/2011   Challa et al.
8,216,972 B1   7/2012   Fabry et al.
(Continued)

*Primary Examiner* — Wesner Sajous
(74) *Attorney, Agent, or Firm* — Woods Rogers PLC; Timothy Bechen; Nathan Evans

(57) ABSTRACT

A computerized method and system enables secure association of digital content with physical items through image-based authentication and augmented reality display. The method and system captures a key associated with a physical item and receives an image of the item via a mobile computing device's camera. The system processes the captured image to generate a unique fingerprint value, which is then compared against reference values using software accessed through the captured key. Upon successful authentication based on both the key and fingerprint comparison, the system retrieves associated digital content items from storage and generates an augmented reality display that overlays the content onto the live image of the physical item on the mobile device screen. This approach provides a secure mechanism for linking digital information to real-world objects while delivering an interactive augmented reality user experience.

26 Claims, 5 Drawing Sheets

(51) Int. Cl.
  *G06K 7/10* (2006.01)
  *G06K 7/14* (2006.01)
  *G06V 10/75* (2022.01)
  *G06V 20/20* (2022.01)
  *H04L 9/32* (2006.01)

(52) U.S. Cl.
  CPC ......... *G06K 7/1413* (2013.01); *G06K 7/1417* (2013.01); *G06V 10/751* (2022.01); *G06V 20/20* (2022.01)

(58) Field of Classification Search
  CPC ... H04L 67/52; H04L 63/0428; H04L 63/061; H04L 63/0853; H04L 63/1466; H04L 63/18; H04L 9/0838; H04L 9/3226; H04L 9/3273; H04L 2209/80
  See application file for complete search history.

(56) References Cited

U.S. PATENT DOCUMENTS

| | | | |
|---|---|---|---|
| 10,950,031 B2 * | 3/2021 | Olson | G02B 27/0101 |
| 11,922,560 B2 | 3/2024 | Emami et al. | |
| 11,995,783 B2 | 5/2024 | Sharma | |
| 12,211,160 B2 | 1/2025 | Newhouse | |
| 2015/0009233 A1 | 1/2015 | Phillips | |
| 2017/0346851 A1 * | 11/2017 | Drake | H04L 9/0838 |
| 2019/0303808 A1 | 10/2019 | Konstam | |
| 2019/0385207 A1 | 12/2019 | Penney | |
| 2020/0279279 A1 * | 9/2020 | Chaudhuri | G06F 40/295 |
| 2020/0319757 A1 | 10/2020 | Arnson | |
| 2020/0404019 A1 * | 12/2020 | Drake | H04L 9/3226 |
| 2021/0142572 A1 | 5/2021 | Shimizu et al. | |
| 2021/0211313 A1 | 7/2021 | Shaffer | |
| 2021/0256174 A1 | 8/2021 | Bowen | |
| 2021/0256773 A1 | 8/2021 | Hare et al. | |
| 2021/0350612 A1 * | 11/2021 | Emami | G01C 21/3632 |
| 2022/0335661 A1 | 10/2022 | Spear et al. | |
| 2022/0345789 A1 | 10/2022 | Fowler et al. | |
| 2023/0109753 A1 | 4/2023 | Alston | |
| 2023/0259378 A1 | 8/2023 | Raffay | |
| 2023/0326148 A1 * | 10/2023 | Sharma | G06T 7/70 345/419 |
| 2023/0334492 A1 | 10/2023 | Tal | |
| 2024/0139611 A1 | 5/2024 | Moll | |
| 2025/0060812 A1 * | 2/2025 | Bond | G06F 3/017 |

* cited by examiner

| AUTHENTICATION | IDENTIFIER |
|---|---|
| AUTH_1 | DEVICE_1 |
| ... | ... |
| AUTH_N | DEVICE_N |

METHOD AND SYSTEM FOR ASSOCIATING AND AUTHENTICATING AUGMENTED REALITY CONTENT WITH A PHYSICAL OBJECT

RELATED APPLICATIONS

There are no related applications.

FIELD OF THE INVENTION

The invention relates generally to distributing augmented reality content and more specifically to providing authorized user-generated augmented reality content and customized content management associated with real-world objects.

BACKGROUND

Augmented reality (AR) technology is well established for advanced user interactions. Existing systems tie AR content and viewership with predetermined items. For example, it is known to use a quick response (QR) code or other types of recognizable pattern as the trigger for launching AR content. Moreover, existing AR content systems typically use curated content generated by a service provide or third-party associated.

For example, U.S. Pat. No. 10,950,031 discloses a system for dynamically generating augmented reality experiences based on the physical environment surrounding an electronic device. Unlike traditional AR systems that rely on pre-programmed content, this technology uses image sensors to detect physical features in the real world and creates adaptive virtual content accordingly. Thus, this technology uses pre-programmed content, restricting the uses available to individual users.

U.S. Pat. No. 11,995,783 B2 discloses a multi-user AR sharing system that enables collaborative experiences across different devices and locations. This technology allows users to create spatial anchors-virtual reference points tied to physical locations-which can be shared with other users through network-accessible services. When a user captures image data of their physical environment, the system creates a spatial representation and associates it with these anchor points, enabling consistent AR experiences across multiple devices. Thus, this system recognizes using additional data points to improve AR content but again limits AR content management and access.

U.S. Pat. No. 11,922,560 additionally uses spatial anchors across physical locations to create persistent AR experiences. This system works by capturing image data at a first location, creating a spatial representation with anchor points, and then tracking user movement to a second location, also failing to account for AR content management and access.

A key innovation across these patents is the integration of network-based storage and retrieval systems for AR content. The second and third patents specifically detail how spatial representations, anchor points, and associated AR content are stored on network-accessible services. This cloud-based approach enables multiple users to access the same AR experiences and allows for persistent AR content that remains available across different sessions and devices. Users can save their AR creations to the network and other users can retrieve and experience them in the same physical locations.

The prior art relies on image processing and computer vision capabilities, including tracking activities and maintaining accurate positioning of virtual content. These patents illustrate the shortcomings of the AR ecosystem, specifically the inability to both associate AR content with user-generated content and tie AR output content with various physical objects.

Another example of the present state of the art is Pub. No. 2025/0060812 for triggering augmented reality by physical objects. This patent publication describes integrating a user headset and everyday common user interactions by triggering AR content and de-triggering AR content, including using various types of sensors. Moreover, this publication is about presenting content within an environment using a generalized 3D mapping and item recognition within the mapped environment.

The prior art techniques fail to account for management of AR content and the more generalized recognition of standard physical objects as the basis for AR content distribution. Moreover, the prior arts rely on system-fed or system-generated AR content and thus lack the ability for a user to associate AR content with a physical object, as well as allowing the user to directly manage the AR content.

As such, there exists a need for a computing method and processing system that allows for user-generated association of AR content with physical objects, as well as allowing user-generated and user-management of AR content.

BRIEF DESCRIPTION

The present innovation improves upon the prior art restrictions with user-generated and user-controlled AR content, as well as tying AR content access and authorization to physical items.

In one embodiment, a computerized method and system executed on a mobile computing system provides for electronically associating digital content items with physical items. The method and system is capable of operating within diverse computing environments including standalone mobile computing systems, mobile devices connected to wireless networks, cellular networks, WiFi networks, and other telecommunication networks, as well as mobile devices operating within distributed computing architectures such as Internet of Things (IoT) ecosystems, mesh networks, and peer-to-peer networks.

The method and system includes capturing a key associated with a physical item. Capturing of this key can take any number of suitable formats, including for example scanning a QR code, bar code, or other type of code, an RFID signal, by way of example.

The capturing of key by a mobile computing device initiates a second step of receiving an image via an image capture device, where the image serves as a digital representation of the physical item. The method and system electronically processes this digital representation to determine a unique fingerprint value associated with the physical item.

Based on the key, the mobile computing device performs a tailored or directed function of comparing the fingerprint with a dataset of reference values to determine a match of the fingerprint with a first reference value. The key unlocks the ability to compare the fingerprint with reference values and the mobile computing device having the fingerprint indicates an authorization of the user by representing the user in the presence of the physical item.

Upon authentication of the user based on the key and the comparison of the fingerprint, the method and system includes electronically receiving content items from a content storage device. Accessing content can use a content reference based on the fingerprint value.

The content storage devices may comprise various storage architectures including local storage, network-attached storage (NAS), storage area networks (SAN), distributed file systems, cloud storage platforms, content delivery networks (CDNs), database management systems, NoSQL databases, blockchain-based storage systems, and/or hybrid storage solutions spanning multiple computing platforms and geographic locations.

Upon successful verification of authorization, the method and system electronically generates an augmented reality output display of the content items in a visual overlay relative to the display of the image of the physical item on the mobile computing device.

The method and system further encompasses receiving association commands from users, capturing reference images of physical items, and associating content items with fingerprint values based on user commands. The system supports various types of digital representations, including processing analysis of image captures and pre-existing codes associated with or imprinted on physical items. The augmented reality display capability includes presenting images, two-dimensional video, three-dimensional video, and audio output in the visual overlay.

Additional features include generating sharing invitations based on authorization values and transmitting such invitations to second mobile computing devices to grant access to content items. The authorization verification process may utilize blockchain-based databases for enhanced security. The system supports various physical items including pictures, tickets, souvenirs, business cards, greeting cards, and gift cards, with associated content including collages of images, videos, and personalized messages.

The above method can be executed in one or more processing environments. One embodiment includes a mobile computing device or similar device for capturing image content and communicating with a network location, the network location includes one or more server-based processors for authenticating, storing, and/or distributing AR content. The processing device operates in response to executable instructions to perform the same core functions as the first embodiment but from a system architecture perspective. The computing system is configured to operate within various computing infrastructures including client-server architectures, multi-tier architectures, service-oriented architectures (SOA), microservices architectures, serverless computing platforms, containerized environments, virtualized computing environments, and hybrid computing platforms that span on-premises and cloud-based resources.

A further embodiment provides a computerized processing method and system that operates as a platform for associating digital content items with physical items and generating electronic outputs for augmented reality displays. This embodiment focuses on the server-side or platform-side processing that supports the mobile device operations described in the first two embodiments. The platform processing method is adaptable to various computing platforms and network architectures, including cloud computing platforms (public, private, hybrid, and multi-cloud), edge computing networks, fog computing environments, distributed computing systems, parallel processing systems, grid computing networks, high-performance computing (HPC) clusters, and enterprise computing infrastructures.

The platform method and system begins with electronically receiving and storing digital content items within databases. The system receives fingerprint values and electronic instructions for associating digital content with fingerprint values, creating the foundational associations that enable the mobile device operations. The databases and storage systems may be implemented across various computing platforms including relational database management systems (RDBMS), NoSQL databases, distributed databases, in-memory databases, time-series databases, graph databases, object storage systems, and hybrid database architectures that span multiple computing environments and geographic regions.

This embodiment associates authorization values with fingerprint values to restrict access to digital content items. The platform receives fingerprint values from mobile computing devices, verifies authorization via authorization values, and upon successful authorization, electronically transmits digital content items to mobile computing devices in formats suitable for augmented reality display output.

The platform method and system includes receiving digital content items via graphic user interfaces through data upload operations, storing content items in databases, and receiving fingerprint values representing digital representations of physical objects. The system supports various types of digital representations, including those generated from image capture operations and data values matching future image capture operations.

The platform generates commercial interfaces complementary to augmented reality displays and transmits such interfaces to mobile computing devices. The digital content items transmitted for augmented reality display include images, videos, and audio output for visual overlay generation. The platform supports the same variety of physical items and associated content types as the other embodiments.

Herein, the method and system improves the use of AR content by allowing for authentication of access, content management on the back-end by the user and/or content provider, as well as tying AR content with a greater range of physical objects.

BRIEF DESCRIPTION OF THE DRAWING

The invention will be described with respect to the following drawing figures, in which like numerals represent like features throughout the description, and in which.

DETAILED DESCRIPTION

The method and system provides technical advantages over existing systems. As further described below, the method and system includes secure association via the identification system linking physical items and digital content while maintaining security through authorization verification across various computing platforms and network architectures. The method and system additionally provides enhanced user experience by providing an immersive and interactive user experience that goes beyond traditional digital content presentation, optimized for various mobile computing platforms and display technologies.

The method and system provides for authentication and validation of ownership, possession, and/or access to additional content. The key function activates executable code that defines a comparison function between an image capture of the physical item, e.g. fingerprint, with a limited set of reference values. The combination of the key and the fingerprint therefore authenticates not only possession of the physical item but also authorized access to content.

The method and system further includes authorization control, providing secure access control that can utilize advanced technologies such as blockchain-based databases, distributed ledger systems, and various authentication frameworks across multiple computing platforms for authentication. The method and system further provides for controlled sharing of access to digital content associated with physical items across various network architectures and computing platforms.

As described in greater detail below, the present method and system allows a user to tie AR content to a physical item. Additionally, the user can then upload content available for AR output associated with the object.

One example may be a physical picture frame having a picture therein, such as a picture from a user's vacation. Associated AR content can include additionally images, videos, or other content from the vacation. In one embodiment, the frame may include an RFID tag or a QR code. For example, if the vacation was to a beach resort, the physical image may be a picture of the user standing on the beach and the AR content can be video footage of the user building a sandcastle, surfing, or other beach-related activity. As the method and system includes authentication and verification of access to the AR content, the user can then obtain the key from the picture frame and the fingerprint of the image as the physical item source. Based on the key and fingerprint, the user can then be authenticated to receive the AR content to his or her mobile device.

Further embodiments may include authorizing other users to view the content, for example authorizing a friend to view the AR content when visiting and in the presence of the physical picture/picture frame. In this case, the other user having access to the key and the fingerprint grants access to the AR content.

Figure 1:
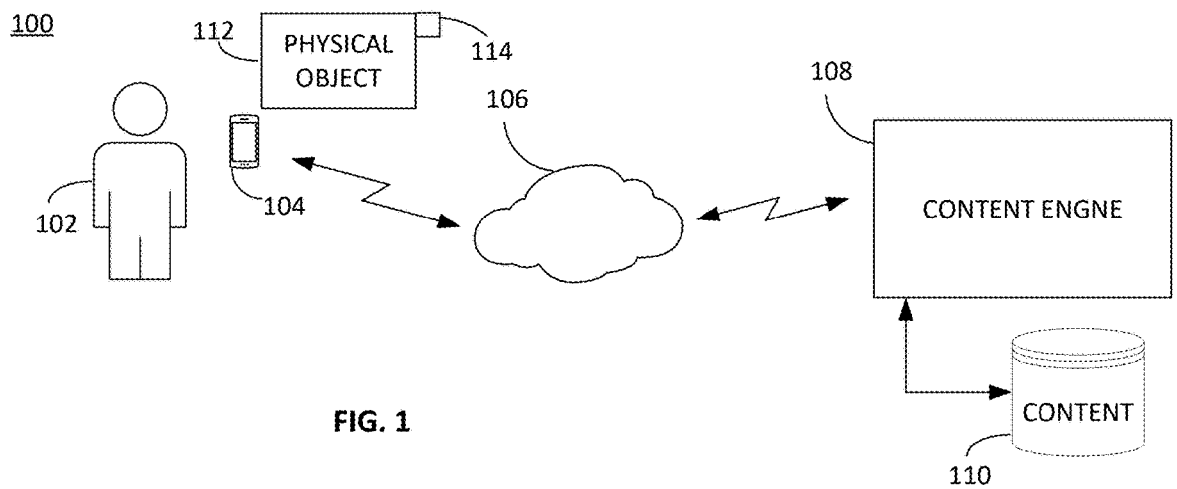
FIG. 1 is a schematic diagram of a processing system.

FIG. 1 is a schematic diagram of a system providing for augmented reality secondary content. The system 100 includes a user 102 with a mobile computing device 104 having network access. The network 106 provides communication with a network-based content engine 108, having AR content stored in a content database 110. Moreover, the system 100 includes one or more physical items 112.

The user 102 is any individual or group of users. The user may be a standard user operating the mobile computing device, which can be any suitable type of mobile computing device, including but not limited to a smartphone, tablet computer, AR glasses or other type AR system or headset, laptop or desktop computer, gaming system, etc. In a typical embodiment, the mobile computing device 104 is a smart phone or tablet computer having processing elements for executing applications therein. As described in greater detail below, the user may download an executable application running directly on the mobile device. In another embodiment, the mobile device may include local software operating in combination with server or network-based software for performing operations as noted herein.

The network 106 can be one more wired and/or wireless networks, otherwise generally referred to as the Internet. For example, a mobile phone may connect via a wireless hotspot using a wi-fi connection through a router connected to a wired network connection. For example, a mobile phone may connect via a cellular network as a gateway.

The network-based content engine 108 can be disposed within a central or distributed network processing environment. For example, the engine 108 can be within a dedicated network server or can be distributed across a web service provider. On the network-side, the content database can be one or more data storage elements having secondary content stored therein, also referred herein as a secondary content database. As described in greater detail below, this data can be specifically generated for AR distribution or can be content managed and/or transformed for AR distribution.

Further illustrated in FIG. 1, the physical object 112 may be any suitable item capturable using a camera or other capture device of the device 104. The physical item 112 may also include a key 114, which can be an object, indicator, emitter, or other device, component, or element for aiding with authentication as described herein. For example, in one embodiment the key 114 can be a printed or otherwise embedded code, such as a QR code, bar code, or other identification capable of being captured by the mobile computing device, such as a camera on the device. For example, in another embodiment the key 114 can be RFID tag such as but not limited to a passive RFID tag that emits an RFID signal to a mobile computing device in response to a radio frequency signal emitted by the mobile computing device. Here, the key 114 includes data that triggers software execution for generating a fingerprint of an image and comparing the fingerprint with reference values, as described in greater detail below.

Figure 2:
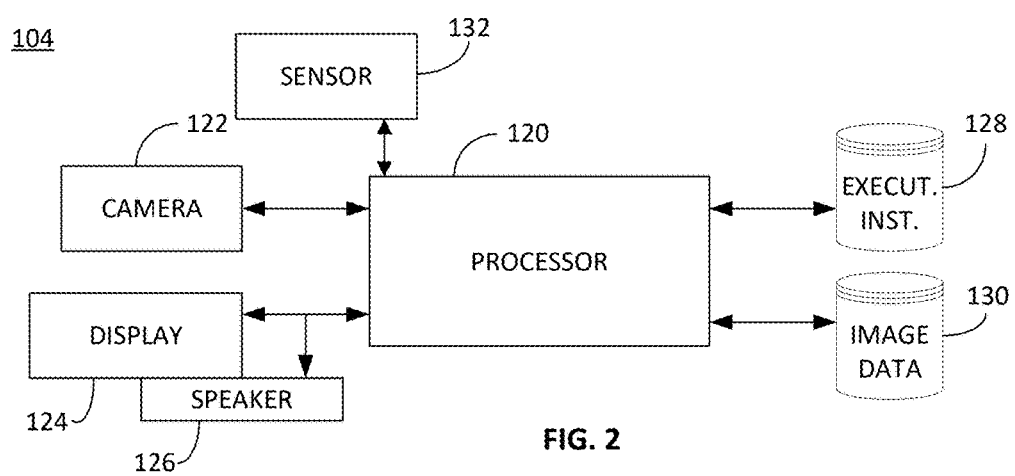
FIG. 2 is a schematic diagram of one embodiment of a mobile computing device.

FIG. 2 illustrates one embodiment of the processing within the mobile computing device 104. The mobile device 104 includes a local processor 120, camera 122, display 124, speaker 126, executable instruction storage 128, image storage 130 and a sensor 132 such as an RFID sensor.

The executable instructions within the storage 128 can include application instructions, otherwise referred to as an app. In one embodiment, the user can download the app to the mobile device and launch or execute the application via the display 124. The storage is a non-transitory computer readable storage medium for storing executable instructions of the application therein.

The display 124 can be both an input and output device, for example a touchscreen. The speaker 126 can be local or Bluetooth. Further embodiments are within the scope of the invention as recognized by a skilled artisan, for example display 124 and speaker 126 can be on a secondary display such using a mirroring function or other wired or wireless distribution for output content.

The application executes on the processor 120 for performing operations as noted herein. For example, in one embodiment, the application can be downloaded from a network-based repository such as an application store. The application can include accessing and using various input and output elements of the mobile processing device 104, for example using the camera 122 for image capture, the processor 120 for processing operations, and display 124, speaker 126 for output operations. In another embodiment, the application can be within the operating system of the mobile computing device. In another embodiment, a light version including limited executables, may become available upon detecting a key, thus not requiring full download and installation of a complete application.

The image data, also referred to as secondary content, stored in the database 130 can be transmitted across the network 106 and processed for output via the display 124 and speaker 126. In one embodiment, the image data includes AR content visible in an AR overlay viewer. In other embodiments, the image data can be flat or 2D imagery such as a static picture or a video, such as simply being visible on the display 124 but not integrated into a formal AR viewer format.

The image data can also be transitory, locally stored as part of the viewing process but not permanently locally stored. In another embodiment, the content can be locally stored and access to viewing the content can be monitored or triggered by external factors, therefore enabling AR content display without requiring the mobile device to be actively connected to an external network.

Figure 3:
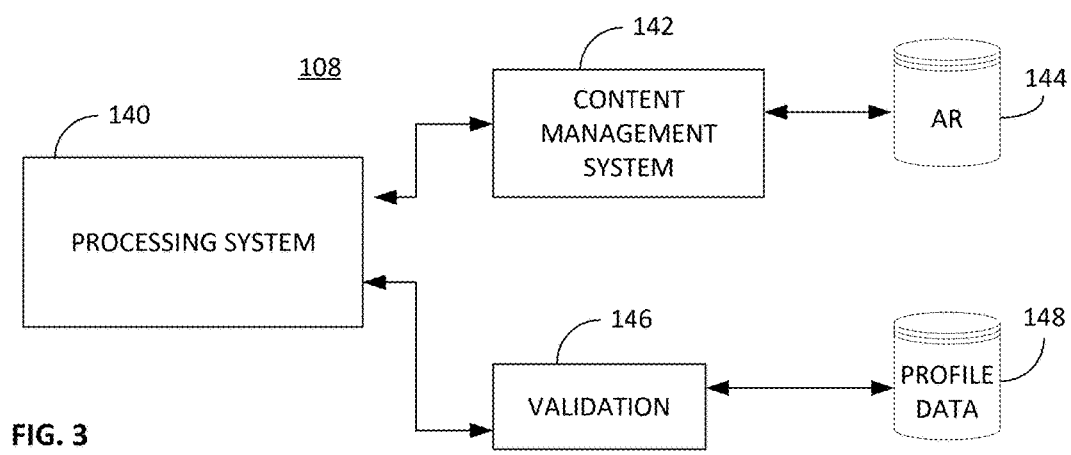
FIG. 3 is a schematic diagram of one embodiment of a network processing system.

FIG. 3 illustrates one embodiment of the network side, including content engine 108. The engine includes a processing system 140 that may be one or more processing devices for receiving content requests from the applications running on the mobile devices.

This embodiment includes a content management system 142 for receiving, managing, and distributing authorized secondary content. This system 142 communicates with at least one AR content database 144. The AR content database includes the content transmitted to the mobile device 102 of FIG. 2. For instance, a musical artist may generate a video thanking fans for attending a recent concert and upload the video as secondary content to the database 144.

This embodiment further includes a validation module 146 in communication with a profile data database 148 having user profile data stored therein. The validation module 146 provides for authenticating the user and validating the user is authorized for receiving or viewing the image data from the database 144. In one embodiment, the user can be validated using the profile data, for example a login verification step, this validation and profile data can then be the foundation for authentication of content access as noted herein.

Figure 4:
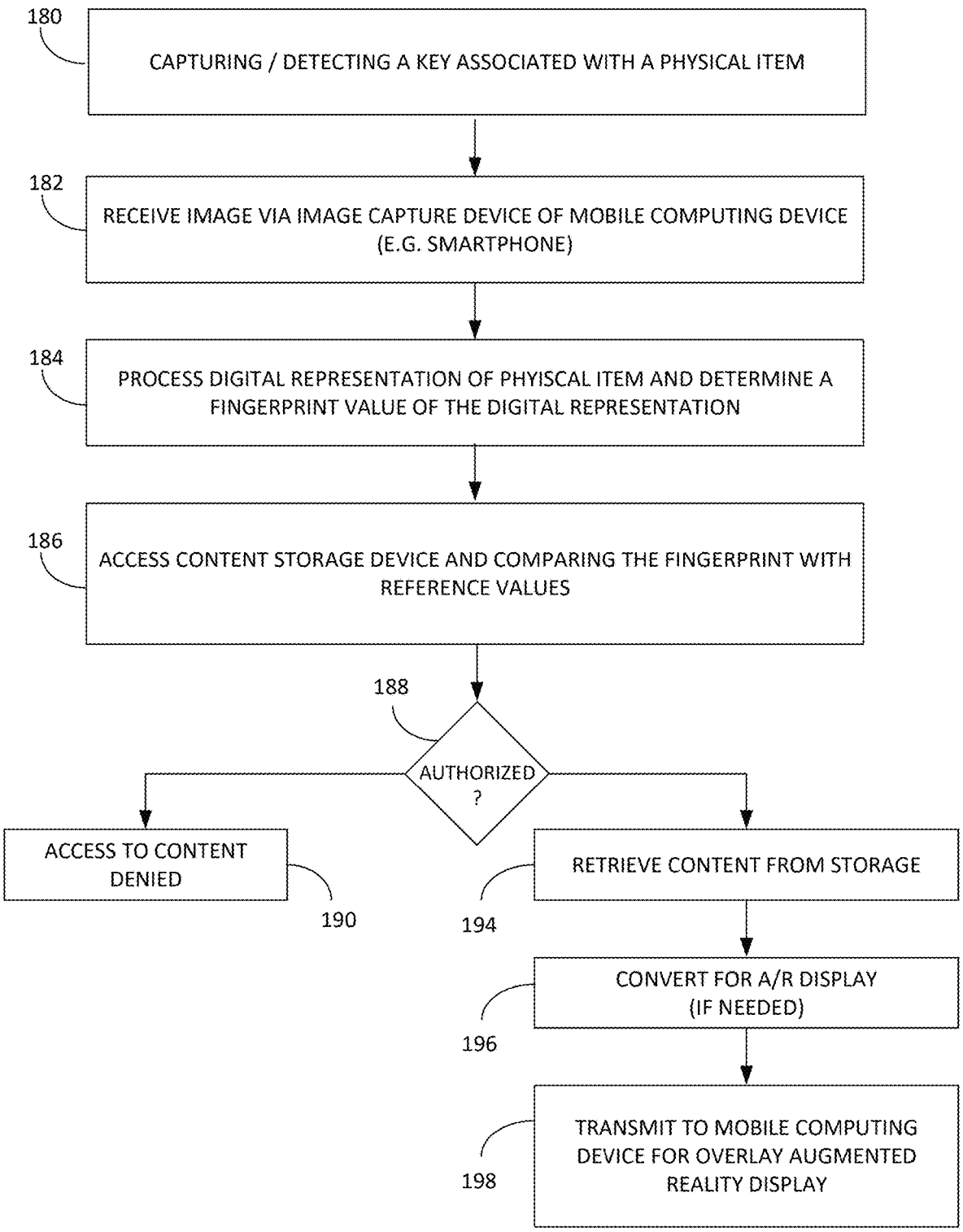
FIG. 4 is a flowchart of the steps of one embodiment of a method as described herein.

The elements of FIGS. 1-3 are illustrative in nature and not an exhaustive or exclusive list of software and processing elements. The present invention includes variations in these elements as recognized by a skilled artisan.

Where FIGS. 1-3 illustrate various embodiments and elements of an augmented reality content distribution system, FIG. 4 is a flowchart of the steps of one embodiment. These operations steps may be performed by the user's processing device capable of providing augmented reality display, for example a mobile phone, laptop computer, video game console system, AR headsets, AR glasses, etc.

FIG. 4 illustrates a flowchart of the steps of one embodiment of a method for securely accessing and displaying augmented reality content using a mobile computing device. The method begins at step 180 including capturing or otherwise detecting a key associated with a physical item. For example, as noted above, the key can be a QR code, bar code, or other physical identifier. In another example, the key can be an RFID tag. Upon capturing the key, the mobile computing device can then execute software code relating to content recognition relative to a limited data set.

Step 182 is receiving an image capture device of a mobile computing device, such as a smartphone camera. The image capture device obtains a digital representation of a physical item present in the user's environment, which serves as a trigger for the augmented reality experience. In this example, the user may engage the camera on the phone can hold over and capture an image of the physical item.

At step 184, the system processes the digital representation of the physical item to determine a fingerprint value. This fingerprint value represents unique characteristics of the captured physical item, such as visual features, patterns, textures, or other identifying markers that can be digitally encoded. The fingerprint generation process may involve image analysis algorithms, feature extraction techniques, or other computational methods to create a unique digital signature corresponding to the physical item.

At step 186, the system accesses a content storage device using both the fingerprint value. Based on the key in step 180, the comparison or referencing operations using the fingerprint value is more accurately focused because the key relates to one or more reference values and the comparison step determines if the fingerprint matches or correlates to any one of the reference values.

This dual step approach of using the key and fingerprint ensures that content access requires the presence of the correct physical item because the key is from the physical item and the fingerprint is from an image capture of the physical item. This dual step approach, when both key and fingerprint are validly uses, results in authorizing the device (and hence the user) to access content items including items stored in the content storage device. The content storage device may be a local database, cloud storage system, or remote server containing augmented reality content associated with various physical items.

At decision point 188, the system determines whether the device is authorized to access the requested content based on the key determining the reference values and the fingerprint based on the image capture of the physical item. If authorization fails, the process proceeds to step 190 where access to the content is denied, effectively terminating the augmented reality experience.

Upon successful authorization and protocol compliance, the system proceeds to step 194 where the appropriate content is retrieved from the storage device. This content may include three-dimensional models, animations, text, audio, video, or other multimedia elements designed to enhance the user's perception of the physical item through augmented reality overlay.

At step 196, the retrieved content is converted for augmented reality display if needed. This conversion process may involve format transformation, resolution adjustment, spatial alignment, or other modifications necessary to ensure proper rendering on the mobile device's display in conjunction with the captured image of the physical item.

Finally, at step 198, the processed content is transmitted to the mobile computing device for overlay augmented reality display. The mobile device receives the content and renders it as an overlay on the live camera feed, creating an augmented reality experience where digital content appears to be integrated with the physical item in the user's environment.

Figures 5, 6:
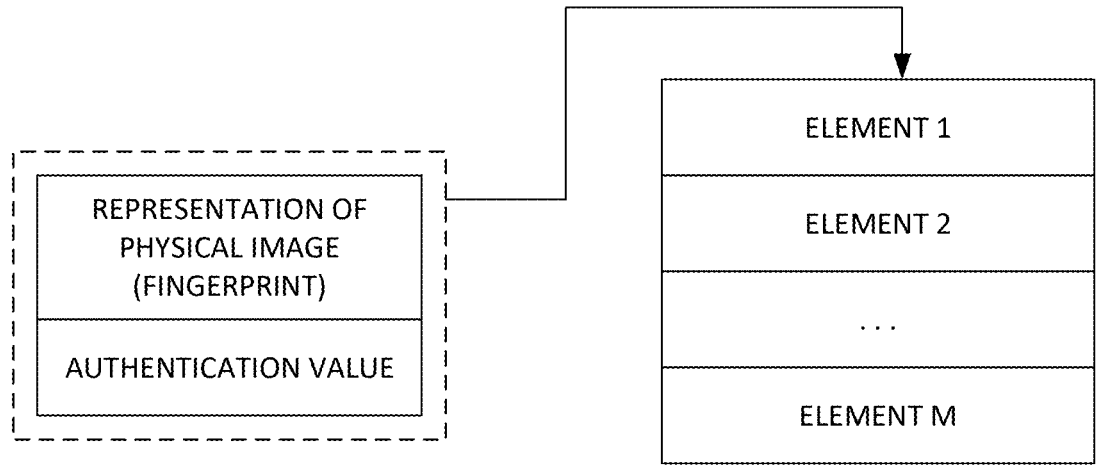
FIG. 5 illustrates a sample data structure for content authentication.
FIG. 6 illustrates a sample data structure for AR content.

FIG. 5 illustrates a sample illustration of a data structure associated with authentication. The authentication can be of any suitable value, such as a unique value associated with the user, the user's device, user's account, or other information that can be used for referencing access to content. For example, one embodiment may include a network-based storage of authentication value(s) associated with a particular user, such that when the value is provided via a mobile computing device, user information can be cross-referenced or otherwise check for authentication. Authentication values can also be associated with one or more specific identifiers. These identifiers can include data fields representing a user, user device, or other element.

Authentication here can be based on the mobile device, and user associated with the mobile device, receiving the key and then generating a fingerprint that matches a reference value. In one example, these operations can be interpreted as authenticating the user has physical possession of the item, possession to receive the key and the ability to take the image capture to generate the fingerprint. This type of authentication can be used for verifying ownership, lineage, provenance of the physical item, and/or authentication for accessing AR content.

For example, one embodiment may include associating authentication with a particular mobile computing device, e.g. a first user's smartphone. In this embodiment, authentication to content is not based on verifying the actual user but instead the use of a particular device. Moreover, single authentications for content can be associated with multiple identifiers. For example, authentication may be associated with a first user logging into an application, the first user then shares or authorizes a second user to access the content, this authentication then updates to include a second device identifier.

Upon authentication, the method and system enables or otherwise distributes AR content. This content can be any suitable output and is not restricted to content generated for the sole purpose of being AR content. For example, a user may upload photos or other image files, videos, audio files, etc. In another example, the user may not need to directly upload but can authorize transfer from one or more third-party storage sources, such as an online content storage device or system. In another example, based on connectivity between systems, the content may stay resident on third-party systems and the system can include access links to redirect and acquire or otherwise access/download the content directly from third-party source(s).

In one example, the physical device may be a commemorative card, such as a sports memorabilia card associated with a particular sporting event. A key and fingerprint can be used to authenticate ownership and the authentication values can be stored in any suitable network or other distributed data structure (e.g. blockchain) to authenticate ownership and possession.

FIG. 6 illustrates a sample data structure representation of content items associated with or available for AR output. In one embodiment, a data field represents a digital representation of a physical image. Using the example of a picture inside a picture frame, the fingerprint can be a data value based on recognizing the digital image of the item itself.

Varying techniques or embodiments may be utilized for generating the data value representing the fingerprint. For instance, one tool for generating fingerprints is using a computer vision-based image recognition framework, for example Vuforia® available from PTC, Inc. The uploaded image serves as a reference marker that subsequent camera scans are compared against to determine a match. In one embodiment, the system uses a combination of visual features—such as edges, contours, key points, and contrast regions—to generate a unique identifier (or "fingerprint") for the physical item. These features are extracted using image analysis algorithms that are invariant to scale, orientation, and lighting conditions, ensuring reliable recognition in a wide range of environments.

In further embodiments, the fingerprint can be based on a subset or portion of a physical item and is not expressly limited to the physical item itself. In one exemplary embodiment, a QR code or other identifier can be used, so the fingerprint as used herein can be a digital version of the code or other identifier.

As noted in FIG. 6, the fingerprint can also include authentication value(s). In one embodiment, the authentication can be binary, representing either yes (1) for approval and (0) for denial. In further embodiments, the value can be any numeric, alpha-numeric, or other values usable by the platform to authenticate access to content.

FIG. 6 further notes the tying of the fingerprint with authentication of content elements. The elements may be specific data files, for example one or more images, one or more video files, one or more audio files, etc. The elements may be pre-formatted or pre-assembled files for content distribution, for example instead of multiple images the element may be an existing slideshow of the images. Moreover, as used herein, the elements represent any suitable content capable of being presented to the AR output and mobile device user interface. In one exemplary embodiment described below, the element may also include commercial values, such as a credit associated with a commercial transaction.

Figure 7:
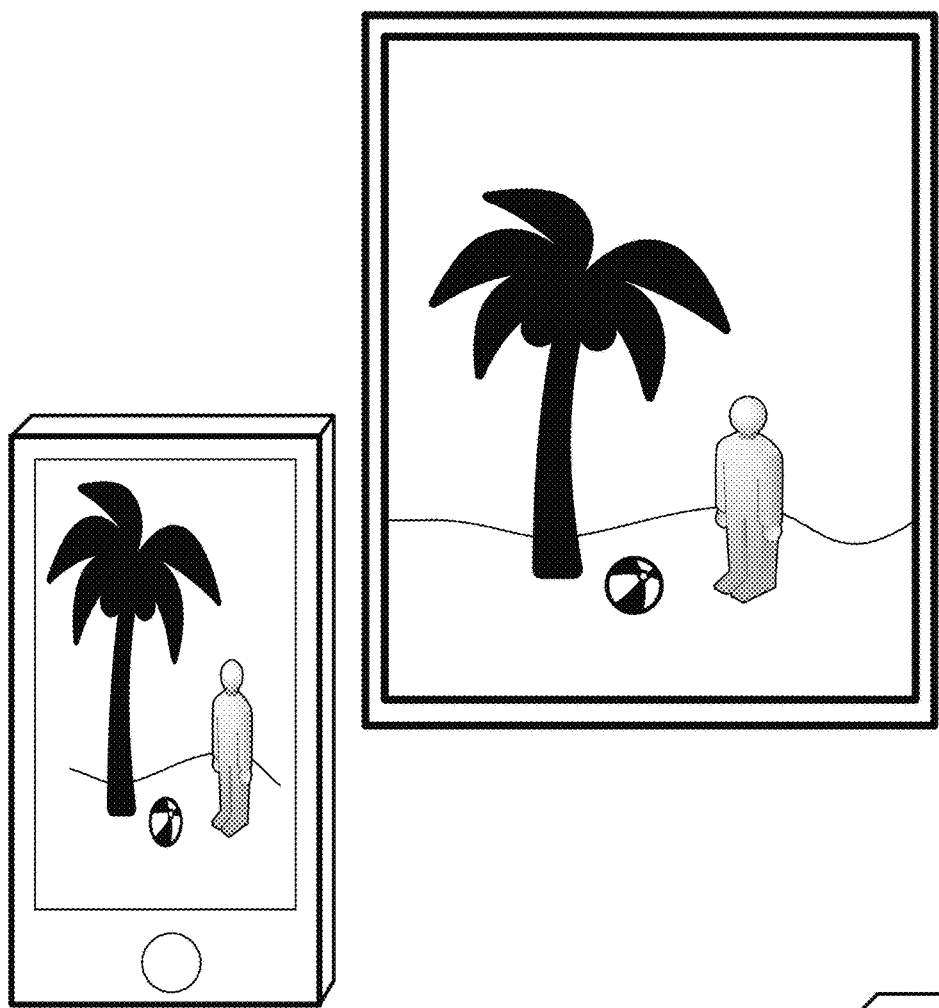
FIG. 7 is a sample illustration of item recognition using a mobile computing device.
Figure 8:
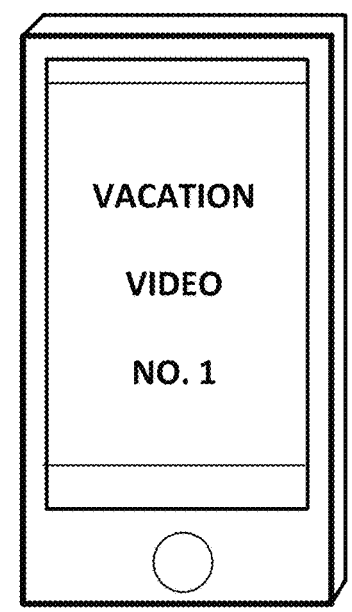
FIGS. 8 and 9 are sample mobile computing devices with AR content.
Figure 9:
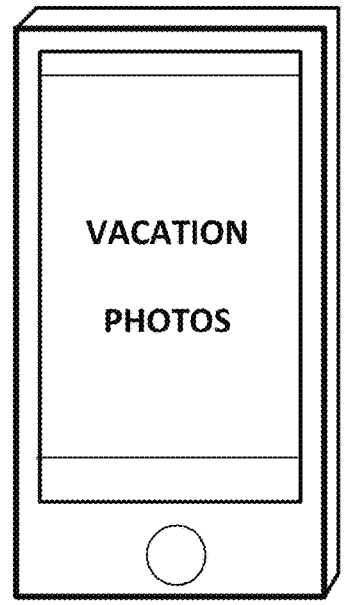

FIGS. 7-9 illustrate one exemplary embodiment for using the method and system. In this example, a user captures an image of a picture on a mobile computing device. Here the picture is a framed image of someone on vacation at a beach. Visible in mobile computing devices is a display showing the capture of the image. In one embodiment, the frame of FIG. 7 can include an RFID tag so that a mobile device can capture the key when in proximity.

Via executable software running on the mobile computing device, the device determines the picture is a valid trigger for AR content by determining a fingerprint and comparing it with reference values. Similarly, the computing device can perform authentication operations, such as verifying the user software account or other techniques.

The mobile computing device can then communicate with software for generating AR output. In a networked environment, the device may communicate across a networked connection to a server or other cloud-based processing environment.

FIGS. 8-9 illustrate a sample output, visible in a video overlay of AR content. In this example of overlay, the AR content may be visible within the context of the picture frame as captured within the mobile computing device. In further examples, the AR content may run even outside express overlay restrictions, for example if the user moved the camera so the frame (FIG. 7) is not visible, the AR content may continue to play. FIG. 8 illustrates an example of a vacation video. FIG. 9 illustrates photo(s), such as showing a single photo or a montage of selected photos.

When a user scans the physical item, an interactive action tile can appear within the application interface prompting the user to "Add Content." At this stage, the system has already recognized and processed the physical item's visual characteristics, including its shape, image, and color profile, enabling it to be uniquely identified and linked to digital content. Any other suitable form of UI for adding content may be utilized herewith.

The user is then guided to upload an image or video file to associate with the recognized physical item. Once the content is successfully uploaded and linked, subsequent scans of the physical item will trigger the option to overlay the associated digital content—such as images or video—on top of the item in augmented reality (AR), enabling the user to view the content in an immersive, spatially anchored experience.

Figure 10:
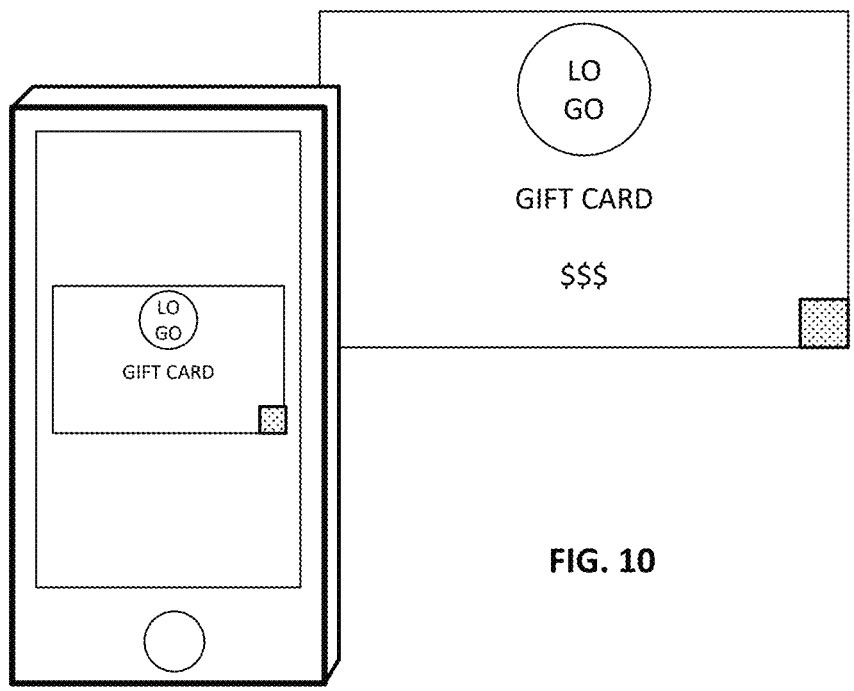
FIG. 10 illustrates an exemplary embodiment of image content recognition of a gift card.
Figure 11:
FIG. 11 illustrates a sample AR content output.
Figure 12:
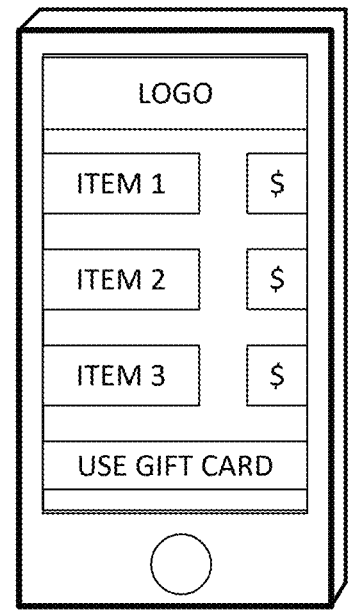
FIG. 12 illustrates a corresponding commercial user interface complimentary to AR content output of FIG. 11.

FIGS. 10-12 illustrate a further embodiment of tying AR content to a physical item. In this embodiment, the physical item can be gift card. A user can purchase the gift card, for example, including monetary value for a recipient to purchase something. In this exemplary embodiment, the gift card includes a QR code in the lower corner, recognition of the QR code generates the key.

The user can also record a video message or create any other suitable audio/visual content for the recipient. In this example, the user may purchase the gift card as a birthday gift to a friend and record a personalized message wishing their friend a happy birthday.

The user can set up the card in the AR distribution system by acquiring a digital image of the physical item. In the case of a standard gift card, the user scan a unique code on the card, or the card itself may include additional unique identifiers to generate the fingerprint. The user may also upload the personalized greeting video and associate the video with the card fingerprint. In one embodiment, the user may also establish an authentication routine validating or otherwise granting authentication to the card recipient to access the content.

Upon presenting the card to the recipient, the recipient can view the card through a camera or other capture device on the recipient's mobile device. FIG. 11 illustrates a sample AR overlay content of the personalized message. In this embodiment, the user gifts the recipient a gift card but includes the personalized message as part of the gift giving process.

The computerized method and system can further include a user interface associated with one or more commercial transactions. In one embodiment, this can be complimentary to the AR content, for example in the FIG. 10 example of a gift card. FIG. 12 illustrates a sample user interface associated with a commercial transaction. In this embodiment, upon watching the personalized message in FIG. 11, the user interface transitions to the commercial interface of FIG. 12 to allow the user to spend the gift card.

In further embodiments, the disclosed system may incorporate advanced authentication and provenance tracking models to manage access, ownership, and trust across digital content associated with physical items. These authentication models extend beyond traditional login or device verification and may include the use of distributed or decentralized technologies, including but not limited to blockchain-based platforms, cryptographic signatures, and ledger-backed access systems.

In one embodiment, the system utilizes a blockchain-based authentication ledger to immutably record the association between a physical item's fingerprint and its linked digital content. Upon initial content upload, a cryptographic transaction may be created and added to a distributed ledger, recording metadata such as the item's unique fingerprint value, content owner ID, timestamp of association, and any relevant access conditions or restrictions. This record provides a tamper-resistant, publicly or privately verifiable record of content provenance and authorship.

In another embodiment, the blockchain system includes the use of smart contracts to define and enforce access rules tied to authentication values. For example, a smart contract may restrict AR content playback to a specific device ID or verified user profile, or may enforce conditions such as expiration dates, single-use playback, or geographic viewing zones. Upon scanning the physical item, the system verifies the requesting device's authorization value against the smart contract conditions. Upon successful fulfillment of the contract terms is the AR content unlocked for output. These contracts can be across any number of various parties, ranging from content generators, event promoters, venues, ticketing platforms, users, advertisers, or other any suitable party. For example, the contract may include requirements for maintenance fees for digital content storage and access such that upon confirmation of fee payments satisfying the contract, access to content is granted or maintained.

Further embodiments include the use of non-fungible tokens (NFTs) or similar unique digital assets to represent access rights to specific AR content experiences. Each token may be cryptographically tied to a physical item fingerprint, serving as a transferable and verifiable certificate of access. In this configuration, content owners may issue or sell NFTs that correspond to one-time or recurring access to premium or exclusive AR content, particularly in scenarios involving limited-edition merchandise, collectibles, or ticketed experiences.

In yet another embodiment, the authentication model includes a hybrid distributed architecture, combining both on-chain and off-chain data. The fingerprint-to-content association may be recorded on-chain, while the content itself remains hosted in secure off-chain databases or content delivery networks. This approach allows for scalable and efficient AR content delivery while maintaining cryptographic assurances around origin and authorization.

Provenance of physical items may also be tracked over time using a distributed ledger that logs each user interaction, content update, or ownership transfer. For example, in a clothing or collectible context, the system may record the item's journey through various custodians or environments, with each interaction logged as a transaction on the blockchain. This historical chain of custody can be rendered to the end user in the form of a timeline, AR experience, or provenance certificate.

In an enterprise context, distributed authentication systems may integrate with federated identity providers (e.g., OAuth, SAML) or decentralized identifiers (DIDs), allowing external systems to validate the requesting user's identity without requiring centralized user databases. This model is especially useful for cross-platform AR deployments in corporate, educational, or multi-brand ecosystems.

These authentication and provenance models offer enhanced trust, transparency, and control to content owners, users, and third-party stakeholders. By leveraging distributed systems such as blockchain, the invention provides tamper-evident verification of digital content associations and ensures secure, auditable access to AR experiences linked to physical items.

The following descriptions illustrate various exemplary embodiments and use cases in which the disclosed method and system for associating augmented reality (AR) content with physical items may be implemented. These examples are provided for illustrative purposes and are not intended to limit the scope of the invention, which may be applied to numerous other scenarios involving digital content management, authentication, provenance verification, and AR output across commercial and personal domains.

In one embodiment, the system may be utilized to enhance commemorative media, such as printed photographs, posters, or framed pictures. A user may capture an image of a physical photo using a mobile computing device. The system generates a fingerprint associated with the photo and allows the user to upload related AR content, such as videos or additional images from the same event. When viewed through a mobile device, the AR system overlays the associated content in alignment with the original photo, providing an enriched multimedia experience. For instance, a vacation photo may trigger a video montage of related activities or scenes from the trip. In this embodiment, blockchain-backed records may be used to verify authorship or ownership of the associated AR content.

A benefit of the system and method disclosed herein is the security associated with distributed content. The system and method using the key and fingerprint as validation steps prevents unauthorized distribution of content. The output content being in AR format is not capturable for retransmission. Therefore, individuals or other entities generating content for distribution within the present platform have assurances the content cannot be duplicated and improperly re-distributed.

In another embodiment, the system is used in conjunction with consumer product packaging. A physical product box or label may contain a recognizable image or surface design that serves as the physical trigger. Upon recognition by the image capture system, AR content such as instructional videos, product animations, or promotional offers is delivered. The fingerprint may be derived from the shape, design, or label of the product, and content may be retrieved from a network-based content engine upon verification of user authorization. Blockchain integration in this use case may support traceability of promotional campaigns or validation that the AR experience originated from an authorized source.

A further embodiment includes applications in educational and museum environments, where physical items such as textbook pages, exhibit placards, or museum displays may act as the trigger object. Upon recognition, the AR system may display interactive educational material including diagrams, translations, curator commentary, or spatial overlays to enhance the learning experience. This use case benefits from the system's ability to operate across distributed networks and support access control through verified authentication mechanisms. Blockchain smart contracts may be used to manage multi-user access rights, ensuring educational content is shared appropriately across institutions or devices.

The system may also be implemented in publishing and entertainment media, wherein printed publications such as books or magazines include pages or illustrations acting as the trigger. Scanning these elements may activate AR content such as animated scenes, behind-the-scenes commentary, or interactive games. For example, a children's book may include images that, when scanned, display animated characters or read-aloud narration through AR output. In this embodiment, blockchain may be used to manage publishing rights, enforce content licensing terms, or verify the authenticity of enhanced editions.

In one commercial embodiment, the system supports gift card and greeting card personalization. A user may scan a purchased card, generate a fingerprint of the physical card, and associate it with a personalized video or audio message. The recipient, upon scanning the card with their device, is authenticated and presented with the personalized message via AR display. The system may then transition to a commercial interface for redeeming or spending the associated value, as illustrated in FIGS. 10-12. Blockchain technology may be used to track the association between card and content, verify content authenticity, or log redemptions for digital accountability.

In event and venue settings, the method and system can enable fan engagement and experiential enhancements. Printed tickets, event wristbands, or commemorative badges may serve as the physical item. Scanning such items may initiate playback of highlight videos, artist thank-you messages, or exclusive backstage content. Verification and authentication can be based on any number of embodiments including cross-referencing with a ticketing platform, geolocation data noting the user is physically within the venue, among other techniques. The system allows content creators and event organizers to manage access rights through authentication values, ensuring content distribution is controlled and secure. Blockchain-based authentication may further ensure time-limited or single-use access, verify digital collectible status, or establish digital ownership of fan experiences. Moreover, access to this content is via the platform with storage and management done within the platform, the platform further offering validity of provenance of the content items using techniques noted herein.

Additional embodiments include interactive marketing, loyalty rewards, and collectible campaigns, in which branded items (e.g., printed cards, product inserts, or limited-edition packaging) act as triggers for evolving AR content. Users may unlock tiered experiences, promotional offers, or gamified achievements through repeated or time-based interactions with the physical item. In one scenario, a marketing campaign may use a printed poster series to progressively reveal portions of an AR story as different posters are scanned. Blockchain systems may be used to log user interactions, verify reward eligibility, or issue non-fungible token (NFT)-based incentives tied to physical-item engagement.

In another embodiment, the system may be applied to clothing items, such as printed T-shirts, sweatshirts, or apparel bearing custom artwork, logos, or imagery. A fingerprint may be generated from the visual characteristics of the garment—such as the placement of a graphic design, brand logo, or label—and associated with digital content uploaded by the garment creator, brand, or user. Upon scanning the shirt using a mobile computing device, the system delivers AR content such as animations, artist commentary, campaign messaging, or interactive experiences. For example, the key may be embedded within the document, such as a unique tag, code, or other identifier. For example, in some areas officially authorized merchandise may include a special tag, hologram, or other identifier noting the item's authenticity, this element can then be used for the key. The item itself or a portion of the item can then be photographed to generate a fingerprint. Blockchain-based storage may log the original content association and prove the provenance of limited-run or artist-signed apparel drops, ensuring digital authenticity across resale or collector markets.

A further embodiment includes the use of retail product tags, such as hang tags, barcode cards, or embedded visual labels affixed to items in a retail environment. The visual fingerprint of the tag or label serves as the physical identifier. Upon scanning, AR content such as product usage tutorials, assembly instructions, promotional campaigns, or product origin information is presented to the user. Blockchain functionality may be used in this context to track product origin and movement across the supply chain, allowing retailers to offer verified "storytelling" overlays—for example, tracing a jacket's materials or ethical sourcing from manufacturer to shelf.

While the embodiments above provide representative examples, the system is adaptable for use in numerous other contexts, including healthcare (e.g., scanning medication packages to trigger AR instructions), enterprise training (e.g., overlaying safety procedures on equipment), physical activities (e.g. scanning a machine at a gym and receiving AR instructions tailored to the user's background, strength, and training objectives), and tourism (e.g., scanning landmarks to reveal historical reconstructions or interactive guides). The system supports the use of a wide range of physical items and content formats, enabling it to serve as a flexible platform for augmenting real-world objects with user-generated or system-curated digital content.

Where the above examples note the distribution of AR content upon key detection and fingerprint detection, the method and system can include updating the AR content later in time. For instance, if the original content relates to a personalized message by a performing artist at the start of an event (e.g. welcoming them to the show), the method and system can include post-event content of the artist sending a thank you message and discussing highlights of the event as well as sharing some video clips of those highlights. Therefore, the method and system allows for modification, updating, or modifying the AR content so that the AR output based on the key and fingerprint can change over time.

In further embodiments, the method and system may include users themselves uploading or attaching content to the item. In the above example of a concert of other event, the user may wish to upload or associate some of their personal videos and/or images from the event. Therefore, one embodiment can include the user using the key and fingerprint as a foundation for storing and later retrieving their own content. This can be similar to the picture frame embodiment of FIGS. 7-9 of the user loading vacation images and videos to be tied to the static picture frame of the still image from the trip.

It is understood that these embodiments are exemplary and that other variations and combinations of physical items, content types, authentication models, and distributed trust mechanisms (including future distributed data network alternatives) may be employed without departing from the scope of the invention.

The invention has broad application potential across various industries and use cases, including but not limited to entertainment, education, marketing, event management, and personal content sharing. The system's support for various physical item types and digital content formats makes it suitable for diverse commercial and personal applications across multiple computing platforms and network infrastructures.

Herein, the method and system uses AR technology to improve and compliment user experiences by using physical items associated with the experience as a foundation and executable operations to access and display additional visual content. The method and system further improves security and access to content by authorization as part of the AR content distribution.

While the invention has been described with respect to certain embodiments, the description is intended to be exemplary, rather than limiting. Modifications and changes may be made within the scope of the invention.

FIGS. 1-12 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. As used herein, executable operations and executable instructions can be performed based on transmission to one or more processing devices via storage in a non-transitory computer readable medium.

What is claimed is:

1. A computerized method for electronically associating a plurality of digital content items with a physical item for generating an electronic output based at least on an image capture of said physical item, the method comprising:
   capturing a key associated with said physical item;
   receiving an image via an image capture device associated with a mobile computing system, the image being a digital representation of the physical item;
   electronically processing the digital representation of the physical image to determine a fingerprint value associated therewith;
   based at least on the key, accessing a first software executable for comparing the fingerprint value with a first reference value;
   upon authentication of the user based on the key and the comparison of the fingerprint value with the first reference value, electronically receiving content items from a content storage device; and
   electronically generating an augmented reality output display of the content items in a visual overlay relative to a display of the image of the physical item on the mobile computing device.

2. The computerized method of claim 1, wherein the key associated with the physical items includes at least one of: a bar code, a quick response (QR) code, and an RFID signal.

3. The computerized method of claim 1, wherein the first software executable compares the fingerprint value with a plurality of reference values stored in at least one reference database such that the authentication of user is based on the capturing of the key and the receiving the image representing the physical item.

4. The computerized method of claim 1 further comprising:
   electronically presenting a commercial interface complimentary to the augmented reality display for display on the mobile computing device, wherein the commercial interface enables at least one of: electronic commercial activities, electronic donation activities, and accessing a ticket to an event.

5. The computerized method of claim 1, wherein the digital representation of the physical item includes a processing analysis of the image capture of the physical item.

6. The computerized method of claim 1, wherein the augmented reality display includes at least one of: a plurality of images, two-dimensional video, three-dimensional video and audio output as generated by the mobile computing device in the visual overlay.

7. The computerized method of claim 1 further comprising:
recording authentication of the user based on the key and the fingerprint value within a distributed data network.

8. The computerized method of claim 7, wherein the recordation of the authentication provides for an authenticity and a provenance of the physical item.

9. The computerized method of claim 1, wherein the physical items includes at least one of: a picture, a ticket, souvenir, a business card, a greeting card, and a gift card.

10. The computerized method of claim 9, wherein the content items associated with the physical item includes at least one of: a collage of images associated with the item, a video associated with the item, and a personalized message associated with the item.

11. A computing system for electronically associating a plurality of digital content items with a physical item and generating an electronic output based at least on an image capture of said physical item, the computing system comprising:
a mobile computing device having an image capture device disposed therein and at least one processing device operative to, in response to executable instructions:
capture a key associated with said physical item;
receive an image via the image capture device associated with the mobile computing device, the image being a digital representation of the physical item;
electronically process the digital representation of the physical image to determine a fingerprint value based thereon;
based at least on the key, accessing a first software executable for comparing the fingerprint value with a first reference value;
upon authentication of the user based on the key and the comparison of the fingerprint value with the first reference value, electronically receive content items from a content storage device; and
electronically generate an augmented reality output display of the content items in a visual overlay relative to a display of the image of the physical item on the mobile computing device.

12. The system of claim 11, wherein the key associated with the physical items includes at least one of: a bar code, a quick response (QR) code, and an RFID signal.

13. The system of claim 11, wherein the first software executable compares the fingerprint value with a plurality of reference values stored in at least one reference database such that the authentication of user is based on the capturing of the key and the receiving the image representing the physical item.

14. The system of claim 11, the processing device in response to further executable instructions, operative to:
electronically present a commercial interface complimentary to the augmented reality display for display on the mobile computing device, wherein the commercial interface enables at least one of: electronic commercial activities, electronic donation activities, and accessing a ticket to an event.

15. The system of claim 11, wherein the digital representation of the physical item includes a processing analysis of the image capture of the physical item.

16. The system of claim 11, wherein the augmented reality display includes at least one of: a plurality of images, two-dimensional video, three-dimensional video and audio output as generated by the mobile computing device in the visual overlay.

17. The system of claim 11, the processing device in response to further executable instructions, operative to:
record authentication of the user based on the key and the fingerprint value within a distributed data network.

18. The system of claim 17, wherein the recordation of the authentication provides for an authenticity and a provenance of the physical item.

19. The system of claim 11, wherein the physical items includes at least one of: a picture, a ticket, souvenir, a business card, a greeting card, and a gift card.

20. The system of claim 19, wherein the content items associated with the physical item includes at least one of: a collage of images associated with the item, a video associated with the item, and a personalized message associated with the item.

21. A computerized processing method for associating digital content items with a physical item and for generating an electronic output based at least on an image capture of said physical item, the processing method comprising:
electronically receiving a plurality of digital content items and storing the digital content items within at least one database;
electronically receiving a key and a fingerprint values and electronic instructions for associating at least one of the plurality of digital content with the fingerprint value;
associating an authorization value with the key and fingerprint values such that access to the digital content items is restricted based thereon;
receiving the key and fingerprint values from a mobile computing device and verifying authorization via the authorization value; and
upon authorization via the authorization value, electronically transmitting the digital content items to the mobile computing device in a format for outputting an augmented reality display on the mobile computing device.

22. The computerized processing method of claim 21 further comprising:
via a graphic user interface, receiving the plurality of digital content items is via a data upload operation for uploading and storing the digital content items on the database; and
electronically receiving via the graphic user interface the fingerprint value representing a digital representation of a physical object.

23. The computerized method of claim 21 further comprising:
electronically generating at least one commercial interface complimentary to the augmented reality display; and
transmitting the at least one commercial interface for display on the mobile computing device.

24. The computerized method of claim 21, wherein the digital content items transmitted to the mobile computing device for augmented reality display includes at least one of: a plurality of images, a video, and audio output as generated by the mobile computing device in the visual overlay.

25. The computerized method of claim 21, wherein the physical items includes at least one of: a picture, a ticket, souvenir, a business card, a greeting card, and a gift card.

26. The computerized system of claim 25, wherein the contents associated with the physical item includes at least one of: a collage of images associated with the item, a video associated with the item, and a personalized message associated with the item.

* * * * *